United States Patent

[11] 3,627,776

[72] Inventors Horst Bosmagen
 Haan;
 Manfred Plempel, Wuppertal-Elberfeld,
 both of Germany
[21] Appl. No. 807,970
[22] Filed Mar. 17, 1969
[45] Patented Dec. 14, 1971
[73] Assignee Farbenfabriken Bayer Aktiengesellschaft
 Leverkusen, Germany
[32] Priority Apr. 3, 1968
[33] Germany
[31] P 17 70 122.3

[54] CERTAIN PHENOXY- AND PHENYLTHIO-1,2-BENZISOTHIAZOLES AND THEIR PRODUCTION
 12 Claims, No Drawings
[52] U.S. Cl. .................................................. 260/304,
 424/270
[51] Int. Cl. ......................................................... C07d 91/12
[50] Field of Search .......................................... 260/304

[56] References Cited
 UNITED STATES PATENTS
3,232,951 2/1966 Lorenz et al. ................. 260/304

Primary Examiner—Alex Mazel
Assistant Examiner—R. J. Gallagher
Attorney—Jacobs & Jacobs ABSTRACT: 1,2-benzisothiazole derivatives of formula

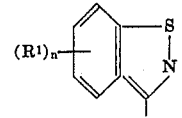

wherein Ar is phenyl, naphthyl, or phenyl or naphthyl substituted by one or more similar or different members selected from the group consisting of halogen, alkyl, alkoxy, alkylmercapto and nitro, Y is oxygen or sulfur $R^1$ is hydrogen, halogen, alkyl, alkoxy, alkylmercapto or nitro and if there are two or three $R^1$ moieties, they are the same or different and $n$ is 1, 2 or 3, are useful as antimicotics. The 1,2-benzisothiazole derivatives are produced by mixing a 3-chloro chloride of formula

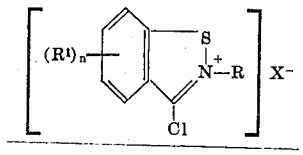

wherein R is an aliphatic, araliphatic or aryl moiety, X is the anion of a strong inorganic acid and R and $n$ are as above defined, with a phenol or thiophenol of the formula

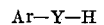

wherein Ar and Y are as above defined followed by heating to from about 150° to about 190°C.

CERTAIN PHENOXY- AND PHENYLTHIO-1,2-BENZISOTHIAZOLES AND THEIR PRODUCTION

This invention relates to new 1,2-benzisothiazole derivatives.

The invention provides new 1,2-benzisothiazole derivatives of the general formula:

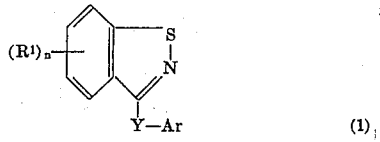

(1)

in which

Ar is a phenyl or naphthyl radical which may be substituted by
  one or more similar or different radicals
  such as hydrogen, halogen, alkyl, alkoxy, alkylmercapto or nitro,
Y is oxygen or sulphur,
$R^1$ is a radical such as hydrogen, halogen, alkyl, alkoxy or alkylmercapto (if there are two or three $R^1$ radicals they may be the same or different) the radical $R^1$, or
one of the radicals $R^1$, may be a nitro group, and
n is 1, 2 or 3, The invention also provides a process for producing these compounds which comprises mixing a 3-chloro-1,2-benzisothiazolium chloride of the general formula:

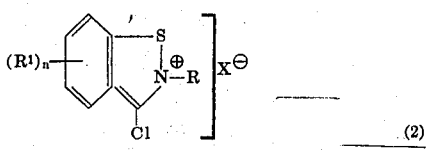

(2)

in which
R is an aliphatic, araliphatic or aryl radical,
X is the anion of a strong inorganic acid, and
$R^1$ and n have the same meaning as in formula (1)
with a phenol or thiophenol compound of the general formula:

Ar—Y—H, (3)

in which Ar and Y have the same meaning as in formula (1) followed by heating to about 150° to about 190° C.

When R is an aliphatic radical it may be for example a straight-chain or branched alkyl radical with one to 12, preferably one to four carbon atoms, and it may be substituted by a lower alkoxy radical and it may contain a double or triple bond.

Of course, the more readily splittable aliphatic and araliphatic radicals, especially lower aklyl radicals, will be preferred in order to facilitate the reaction.

If $R^1$ is or contains an aliphatic radical, this preferably contains one to four carbon atoms. If $R^1$ is halogen, it is preferably fluorine, chlorine or bromine.

Examples of anions X include $BF_4^-$, $HSO_4^-$, $I^-$, and especially $Cl^-$ and $Br^-$.

The 3-chloro-1,2benzisothiazolium chlorides used as starting materials are known or can be obtained by a known method [see Chem. Ber. 99, 2566 (1966].

Phenols or thiophenols which may provide the group Ar—Y—include for example, 2,3-dichloro-phenol, 2,3-dichloro-thiophenol, 2,5-dichlorophenol, 2,5-dichloro-thiophenol, 4-methylmercapto-phenol, 4-methylmercapto-thiophenol, 2-ethylphenol, 2,6-dimethyl-phenol, 3,5-dimethyl-phenol, 4-chloro-3,5-dimethylphenol, 2,5-dimethyl-phenol, 2-isopropyl-phenol, 3-methyl-5-ethyl-phenol, 2,3,5-trimethyl-phenol, 2,6diethyl-phenol, 3-methyl-6-isopropyl-phenol, 4-fluoro-phenol, 4fluoro-thiophenol, 2-fluoro-phenol, 2-fluoro-thiophenol and 3,5trifluoromethyl-thiophenol.

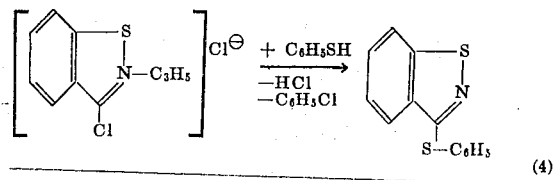

(4)

The process according to the invention is normally carried out by suspending a 3-chloro-1,2-benzisothiazolium compound, preferably N-ethyl-3-chloro-1,2-benzisothiazolium chloride, in an inert, high-boiling organic solvent, preferably 1,2-dichlorobenzene, followed by the dropwise addition of at least the equimolar amount of a phenol or thiophenol at about room temperature. The reaction mixture is subsequently heated to about 150° to about 190° C. The reaction product may be isolated in conventional manner from the syrup which remains after drawing off the solvent.

When preparing the thioethers it may be advantageous, after removal of the disulfide which may simultaneously be formed, to treat the reaction product obtained in known manner, for example with sodium sulfide and subsequently again fractionate it.

The compounds of the invention are valuable chemotherapeutical agents and, more particularly, excellent antimycotics with inhibition values between 4–20 γ/ml. nutrient solution in the case of *Trichophyton mentagrophytes*, *Candid albicans*, *Aspergillus niger* and *Penicillium commune*. The new compounds, e.g., 3-phenoxy-1,2-benzisothiazole, are locally effective in experiments with test animal infections. The test substances are administered locally once daily over a period of 8–10 days in a suitable 0.1–1 percent preparation (tincture dimethyl sulphoxide/glycerol 1:4, or ointments and the like).

The new substances are intended to be used as therapeutical agents, particularly as antimycotics, in human and veterinary medicine and also as plant protective agents.

The invention is illustrated by the following examples.

EXAMPLES 1,2-Benzisothiazole-3-arylether or 3arylthioether: (0.25 mol) N-ethyl-3-chloro-1,2-benzisothiazolium chloride are suspended in 300 ml. 1,2-dichlorobenzene, and 0.25 mol of a phenol or thiophenol are slowly added dropwise. When the addition is completed, the reaction mixture is heated to about 180° C. The splitting off of ethyl chloride takes place above 140° C. which is recognizable by the foaming up of the solution. The mixture is heated at about 180° C. for 1 hour, then cooled and the 1,2-dichlorobenzene drawn off in a vacuum. The remaining dark brown syrup is mixed with about 1 liter of water and the mixture then exhaustively extracted with ether. The ether extract is dried and evaporated in a vacuum. The resulting syrup is fractioned in vacuo.

Yield: 30–60 percent of theory.

With the use of other starting compounds the process is carried out in an analogous manner.

In the case of the 1,2-benzisothiazole-3-arylthioether it may be advantageous to treat the distillation product obtained with $Na_2S$ in order to remove possible admixed disulfide and fractionate it again if necessary. For example, 25 g. (≈0.1 mol) crude thioether are dissolved in 30 ml. dioxan and this solution is introduced into a solution of 25 g. $Na_2S \cdot 9H_2O$ in 100 ml. of water. The mixture is boiled under reflux for 15 minutes while stirring vigorously. The dioxan phase is subsequently separated, diluted with water and the precipitated 3-arylmercapto-1,2-benzisothiazole isolated and, if necessary, distilled.

The compounds obtained according to the above-mentioned process can be seen in the following table and correspond to the formula

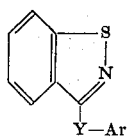

Ar = an optionally substituted phenyl radical

| Substituent on the phenyl radical | Y | M.P. ° C. or B.P. ° C./mm. Hg |
|---|---|---|
| H | S | 58° C.:132° C./0.01 (E). |
| 4-Cl | S | 86° C.:150° C./0.01 (D). |
| 2-CH₃ | S | 148° C./0.01. |
| 4-C(CH₃)₃ | S | 56° C.:174° C./0.01 (E). |
| 2-Cl | S | 68° C.:184° C./0.3 (E). |
| 3,4-Cl₂ | S | 98° C.:180° C./0.01 (E). |
| H | O | 80° C.:150° C./0.3 (E). |
| 2-C₂H₅ | S | 142° C./0.01. |
| 3-Cl | O | 81° C.:148° C./0.01 (M). |
| OC₂H₅ | S | 89° C.:170° C./0.01 (E). |
| 4-CH₃ | S | 92° C.:139° C./0.01 (E). |
| 4-Cl | O | 94° C.:130° C./0.01 (E). |
| 4-Cl:3-CH₃ | S | 86° C.:190° C./0.2 (M). |
| 4-CH₃ | O | 80° C.:142° C./0.01 (M). |
| 4-C(CH₃)₃ | O | 145° C. (D). |
| 2-OCH₃ | O | 103° C.:160° C./0.01 (M). |
| 2,6-Cl₂ | O | 121° C.:140° C./0.01 (M). |
| 4-Cl:2-CH₃ | S | 73° C. |
| 3-Cl:6-CH₃ | S | 81° C.:165° C./0.01 (E). |
| 3-Cl:2-CH₃ | S | 117° C.:175° C./0.01 (D). |
| 3,4-(CH₃)₂ | O | 91° C.:151° C./0.01 (M). |
| 2,4-(CH₃)₂ | O | 62° C.:142° C./0.01 (M). |
| 2,3-(CH₃)₂ | O | 85° C.:134° C./0.01 (M). |

NOTE.—E=ethanol; M=methanol; D=dioxan.

The invention also provides a pharmaceutical composition comprising one or more of the new active compounds in admixture with a solid or liquid diluent or carrier.

The invention further provides a medicament in dosage unit form comprising at least one of the new active compounds either alone or in admixture with a solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a unit dose, or a multiple or submultiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampuls either free or as a sterile solution suitable for parenteral injection; or in any other form known to the art.

What we claim is:

1. 1,2-benzisothiazole derivatives of the formula

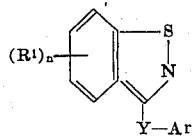

(1)

in which

Ar is phenyl, naphthyl or phenyl or naphthyl substituted by one or more similar or different members selected from the group consisting of halogen, alkyl of one to four carbon atoms, alkoxy of one to four carbon atoms, alkylmercapto of one to four carbon atoms and nitro, Y is oxygen or sulpher, R¹ is hydrogen, halogen, alkyl of one to four carbon atoms, alkoxy of one to four carbon atoms, alkylmercapto of one to four carbon atoms or nitro and if there are two or three R¹ moieties, they are the same or different and n is 1,2 or 3.

2. A 1,2-benzisothiazole derivative according to claim 1 wherein Ar is phenyl or phenyl substituted by one or more similar or different members selected from the group consisting of fluorine, chlorine, bromine, alkyl of one to four carbon atoms, alkoxy of one to four carbon atoms and alkylmercapto of one to four carbon atoms, and R¹ is hydrogen.

3. A 1,2-benzisothiazole derivative according to claim 1 wherein Ar is phenyl, chlorophenyl, dichlorophenyl, chloromethylphenyl, lower alkylphenyl wherein alkyl is of one to four carbon atoms, dimethyl phenyl, methoxy phenyl or ethoxy phenyl and R¹ is hydrogen.

4. 3-Phenoxy-1,2-benzisothiazole.

5. 3-Phenylmercapto-1,2-benzisothiazole.

6. 3-(4-Chlorophenyl)-mercapto-1,2-benzisothiazole.

7. 3-(4-Chlorophenoxy)-1,2-benzisothiazole.

8. 3-(3-Chlorophenoxy)-1,2-benzisothiazole.

9. A process for the production of 1,2-benzisothiazole derivatives according to claim 1 which comprises mixing a 3-chloro-1,2-benzisothiazolium chloride of the formula:

(2)

in which

R is an aliphatic, araliphatic or aryl,

X is the anion of a strong inorganic acid and

R¹ is hydrogen, halogen, alkyl of one to four carbon atoms, alkoxy of one to four atoms, alkylmercapto of one to four carbon atoms or nitro, and if there are two or three R¹ moieties, they are the same or different and n is 1,2 or 3 with a compound of the formula:

$$Ar-Y-H \quad (3)$$

in which

Ar is phenyl, naphthyl or phenyl or napthyl substituted by one or more similar or different members selected from the group consisting of halogen, alkyl of one to four carbon atoms, alkoxy of one to four carbon atoms, alkylmercapto of one to four carbon atoms and nitro and Y is oxygen or sulfur followed by heating at about 150° to about 190° C.

10. A process according to claim 9 in which R is alkyl of one to four carbon atoms.

11. A process according to claim 9 in which X is $BF_4^-$, $HSO_4^-$, $I^-$, $Cl^-$ or $Br^-$.

12. A process according to claims 8 in which the compound of formula (2) is suspended in 1,2-dichlorobenzene, the compound of formula (3) is added dropwise thereto at about room temperature in at least the equimolar amount, and the mixture is heated to 150°–190° C.

* * * * *

UNITED STATES PATENT OFFICE
CERTIFICATE OF CORRECTION

Patent No. 3,627,776          Dated December 14, 1971

Inventor(s) Horst Boshagen et al.

It is certified that error appears in the above-identified patent and that said Letters Patent are hereby corrected as shown below:

Re: Inventors - Change "Horst Bosmagen" to

-- Horst Boshagen --.

In the Abstract of the Disclosure - delete the first formula and substitute therefor the following formula:

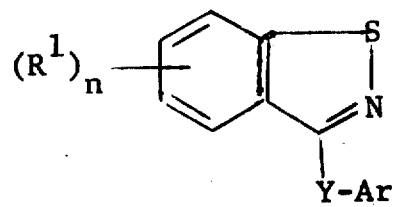

In the specification, column 1, delete the second formula and substitute therefor the following formula

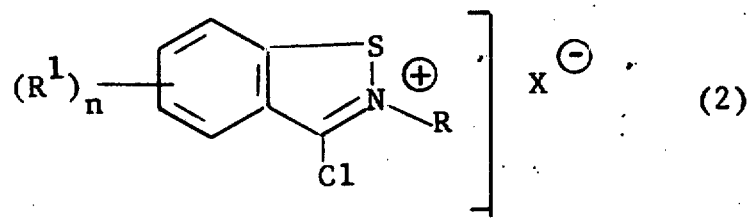

UNITED STATES PATENT OFFICE
CERTIFICATE OF CORRECTION

Patent No. 3,627,776  Dated December 14, 1971

Inventor(s) Horst Boshagen et al.   PAGE - 2

It is certified that error appears in the above-identified patent and that said Letters Patent are hereby corrected as shown below:

In the claims:

In claim 1, delete the formula and substitute therefor the following formula:

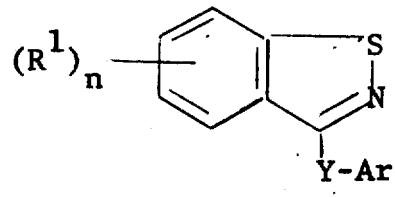

change "sulpher" in definition of Y to --sulphur--.

In claim 9, delete the formula and substitute therefor the following formula:

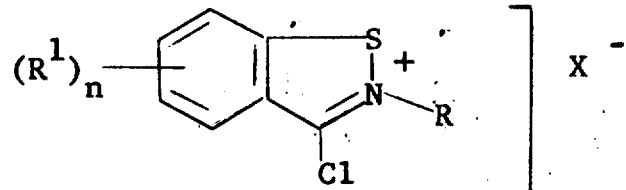

Signed and sealed this 6th day of June 1972.

(SEAL)
Attest:

EDWARD M. FLETCHER, JR.
Attesting Officer

ROBERT GOTTSCHALK
Commissioner of Patents